2,986,479
PROCESS FOR THE PREVENTION OF FORMATION OF ELECTROSTATIC CHARGE

Hans Markert, Dusseldorf, and Herbert Frotscher, Dusseldorf-Benrath, Germany, assignors to Bohme Fettchemie G.m.b.H., Dusseldorf, Germany, a corporation of Germany
No Drawing. Filed Aug. 28, 1958, Ser. No. 757,665
Claims priority, application Germany Aug. 29, 1957
12 Claims. (Cl. 117—139.5)

This invention relates to a method for preventing formation and accumulation of static electricity on synthetic textiles and other shaped synthetic materials.

A great variety of agents have already been proposed for use in preventing the formation of electrostatic charge on fibers, flakes, threads, strands, knitted and woven materials, foils and other shaped objects made of polyamides, polyesters, polyvinyl compounds, cellulose acetate, as well as natural or synthetic albuminous materials. These known agents exhibit various effects, but many of them have the disadvantage that they cannot be incorporated into the materials so that they are resistant against removal by washing, which is very unfavorable, especially for textiles which are constantly subjected to washing processes.

It is therefore an object of this invention to provide a method for treating synthetic materials to prevent the formation and accumulation of static electricity thereon.

It is a further object to provide an antistatic treatment for textile materials subject to repeated washing.

Another object is to provide an antistatic treating agent which is not removed from the treated material by repeated washing.

These and other objects of my invention will become apparent as the description proceeds.

It has now been found that excellent antistatic impregnations, having a high resistance against washing, can be obtained if aqueous solutions of hardenable condensation products formed from aminotriazines or their derivatives, oxo-compounds and polyalkylene oxides are used as the impregnating agent.

The production of such condensation products is known or can be accomplished in accordance with customary processes. Condensable aminotriazines which may be used for this purpose include primarily melamine, but also aminotriazine derivatives, such as oxydiaminotriazine, or bimolecular condensation products, such as melam, may be used. Oxo-compounds which may be used for this purpose include primarily formaldehyde and formaldehyde-yielding compounds, such as paraformaldehyde, trioxymethylene, hexamethylenetetramine, methylal, etc. In addition, acetaldehyde, crotonaldehyde, benzaldehyde, acetone, acetophenone or cyclohexanone may be used. Polyalkylene oxides which may be used include primarily polyethylene glycols having a molecular weight of at least 300. Those having a molecular weight of 600–2000 are of particular practical interest. However, the corresponding polymerization products of other alkylene oxides, such as propylene oxide, epichlorohydrin and the like, as well as mixed polymerizates of different alkylene oxides, may be used.

The quantitative ratios in which the above-mentioned starting components may be used for the reaction depend upon the properties desired for the finished condensation products. For example, a very suitable hardenable condensation product is obtained if 1 mol melamine is condensed with at least 3 mols, and preferably 5–6 mols, formaldehyde and with 1–3 mols, preferably 2 mols, of a polyalkylene oxide. It is also possible to replace a portion of the amount of aminotriazine which is used in the reaction by compounds which contain amino or imino groups wherein the amino group is attached to a CO—, CS—, C(NH)— or CN— group. Suitable compounds which contain amino or imino groups include urea, thiourea, urethane, guanidine, cyanamide, dicyandiamide and dicyandiamidine.

The production of the water-soluble precondensates may be accomplished by heating the starting components together to a temperature of 70–90° C., accompanied by stirring, until a homogeneous reaction mixture is formed. This reaction mixture is then heated to the boiling point, accompanied by driving off the water of solution and reaction until the internal temperature has risen to 110–150° C. Under certain circumstances it may also be of advantage to work under reduced pressure. It must be assumed that the polyalkylene oxides are to a substantial extent combined with the melamineformaldehyde condensates in ether-like fashion. The same effect can also be accomplished by first forming a precondensate from the aminotriazine or a similar amino component and an oxo-compound, and then introducing the polyalkylene oxide and condensing the same with the precondensate.

Condensates thus obtained are dissolved in water and then customary condensation catalysts are added to the solution. The solution should contain about 20–300 gm./liter, preferably from 50–200 gm./liter, of the condensate. The materials to be treated therewith, especially textiles, are treated with the solution, for example by immersion, spraying, brushing, etc. Subsequently, the fabric is squeeze-dried or spin-dried, after which it is dried at temperatures of about 60–150° C.

Another embodiment of the present process consists of a solution which contains a suitable amount of the polyalkylene oxide in addition to the precondensate formed from the aminotriazine and an oxo-compound, the mixture being present in an uncondensed form. After impregnating the fiber with such a solution, the polyalkylene oxide condenses with the resin upon heating the impregnated fabric.

The following examples are set forth to enable persons skilled in the art to better understand and practice our invention and are not intended to be limitative.

Example I 1 mol melamine, 6 mols 30% formaldehyde and 2 mols polyethylene oxide having a molecular weight of 1000 were heated for 10 minutes at 85° C., accompanied by stirring. Subsequently, the reaction mixture was heated to the boiling point, accompanied by further stirring and distilling off any water until the temperature of the liquid increased to 130° C. The reaction was then interrupted. 150 gm. of the precondensate thus obtained were then dissolved in 1 liter water, and 4 gm. ammonium nitrate were added to the solution. Taffeta made of polyamide (Perlon) was impregnated with this solution in the customary manner, for example in a padding machine, and was thereafter squeeze-dried and then completely dried at 80–100° C.

Whereas the untreated Perlon taffeta exhibited an electrostatic charge of 500–5000 volts per cm. when the field strength was measured with a statometer while the fabric continuously revolved over a friction surface of glass, steel or copper, the fabric impregnated according to Example I exhibited an electrostatic charge of, at most, 5 volts per cm. This antistatic effect remained even after washing the fabric 20 times with 2 gm./liter of a fine washing agent, such as alkyl sulfate or alkyl benzene sulfonate, at 40° C., it also remained after washing the fabric 10 times at 60° C. with a commercial high-speed washing agent.

Example II

A solution which contained 80 gm./liter of a condensation product of 0.75 mol melamine, 0.25 mol urea, 5 mols formaldehyde and 1.5 mols polyethylene oxide having a molecular weight of 1500, produced in accordance with the method described in Example I, and which also contained 2 gm. acetic acid, was used for treating a polyacrylic nitrile fabric in the above-described manner. Even after repeated washings, the impregnated fabric exhibited no electrostatic charge when determined according to the above method of measuring.

*Example III*

35 gm. of an approximately 50% aqueous precondensate, formed from 1 mol melamine and 6 mols formaldehyde, as well as 180 gm. polypropylene oxide having a molecular weight of 1200 were dissolved in 1 liter of water after adding 2 gm. crystalline aluminum chloride. A fabric made of polyglycol terephthalate was impregnated in this solution as described in Example I and was thereafter dried and finally subjected to a heat treatment at 120–130° C. for 5–10 minutes. The resulting textile fabric was found to have antistatic properties which were resistant against washing.

While we have set forth specific embodiments and preferred modes of operation of our invention, it will be understood that various modifications and changes may be made thereto without departing from the spirit of the disclosure or the scope of the appended claims.

We claim:

1. A process for preventing the formation and accumulation of electrostatic charges on synthetic materials subject to such charges which comprises impregnating said materials with an aqueous solution of condensation products formed from melamine, formaldehyde, and polyethylene oxides, and subsequently drying said materials at a temperature of 60 to 150° C., wherein the ratio of melamine to formaldehyde is about 1:3 and the mols of formaldehyde are at least equal to the number of hydroxyl groups in the polyethylene oxide.

2. A process for preventing the formation and accumulation of electrostatic charges on synthetic materials subject to such charges which comprises impregnating said materials with an aqueous solution of condensation products formed from 1 mol melamine, 3 to 6 mols formaldehyde and 1 to 3 mols of polyethylene oxide having a molecular weight of at least 300, and subsequently drying said materials at a temperature of 60 to 150° C.

3. A process for preventing the formation and accumulation of electrostatic charges on synthetic materials subject to such charges which comprises impregnating said materials with an aqueous solution of condensation products formed from 1 mol melamine, 5 to 6 mols formaldehyde, and 1 to 3 mols polyethylene oxides having a molecular weight of between 600 to 2000 and subsequently drying said materials at a temperature of 60 to 150° C.

4. A solution for treating synthetic materials for preventing formation and accumulation of static electricity thereon, comprising an aqueous solution of condensation products formed from 1 mol melamine, 3 to 6 mols formaldehyde and 1 to 3 mols polyethylene oxide.

5. A process for preventing the formation and accumulation of electrostatic charges on synthetic materials subject to such charges which comprises impregnating said materials with an aqueous mixture of condensation products formed from about 1 mol of melamine, from about 3 to 6 mols of formaldehyde, and from about 1 to 3 mols of polyethylene oxide, wherein a part of said melamine is replaceable by a compound selected from the group consisting of urea, thiourea, urethane, guanidine, cyanamide, dicyandiamide and dicyandiamidine and subsequently drying said materials at a temperature of 60 to 150° C.

6. A process for preventing the formation and accumulation of electrostatic charges on synthetic materials subject to such charges which comprises impregnating said materials with an aqueous mixture of condensation products formed from an aminotriazine, oxo-compounds and polyalkylene oxides, and subsequently drying said materials at a temperature of 60 to 150° C., wherein the ratio of aminotriazine to oxo-compound is about 1:3 and the mols of oxo-compound are at least equal to the number of hydroxyl groups in the polyalkylene oxide.

7. A process for preventing the formation and accumulation of electrostatic charges on synthetic materials subject to such charges which comprises impregnating said materials with an aqueous mixture of condensation products formed from about 1 mol of an aminotriazine, from about 3 to 6 mols of oxo-compounds and from about 1 to 3 mols of polyalkylene oxides, and subsequently drying said materials at a temperature of 80 to 150° C.

8. A process for preventing the formation and accumulation of electrostatic charges on synthetic materials selected from the group consisting of polyamides, polyesters, polyvinyl compounds, cellulose acetate and albuminous materials which comprises impregnating said materials with an aqueous mixture of condensation products formed from about 1 mol of an aminotriazine, at least 3 mols of oxo-compounds and from about 1 to 3 mols of polyalkylene oxides, and subsequently drying said materials at a temperature of 60 to 150° C.

9. A process for preventing the formation and accumulation of electrostatic charges on synthetic materials selected from the group consisting of polyamides, polyesters, polyvinyl compounds, cellulose acetate and albuminous materials which comprises impregnating said materials with an aqueous mixture of condensation products formed from about 1 mol of an aminotriazine, at least 3 mols of oxo-compounds and from about 1 to 3 mols of polyalkylene oxides, in the presence of hardening catalysts and subsequently drying said materials at a termperature of 60 to 150° C.

10. A process for preventing the formation and accumulation of electrostatic charges on synthetic materials subject to such charges which comprises impregnating said materials with an aqueous solution of the precondensate formed from about 1 mol of an aminotriazine, and from about 3 to 6 mols of oxo-compounds, and from about 1 to 3 mols of polyalkylene oxides, and subsequently causing a condensation of said precondensate polyalkylene oxides by drying said materials at a temperature of 60 to 150° C.

11. A solution for treating synthetic materials for preventing formation and accumulation of static electricity thereon, comprising an aqueous solution of condensation products formed from aminotriazines, oxo-compounds and polyalkylene oxides, wherein the ratio of aminotriazine to oxo-compound is about 1:3 and the mols of oxo-compound are at least equal to the number of hydroxyl groups in the polyalkylene oxide.

12. A process for preventing the formation and accumulation of electrostatic charges on synthetic materials subject to such charges which comprises impregnating said materials with an aqueous solution of condensation products formed from about 1 mol of an aminotriazine; from about 3 to 6 mols of oxo-compounds; and from about 1 to 3 mols of polyalkylene oxides, wherein a part of said aminotriazine is replaceable by a compound containing a radical selected from the group consisting of amino and imino radicals attached to a radical selected from the group consisting of CO—, CS—, C(NH)— and CN— radicals, and subsequently drying said materials at a temperature of 60 to 150° C.

References Cited in the file of this patent

UNITED STATES PATENTS

| | | |
|---|---|---|
| 2,091,106 | Pigott et al. | Aug. 24, 1937 |
| 2,654,720 | Cohen et al. | Oct. 6, 1953 |
| 2,790,764 | Lange et al. | Apr. 30, 1957 |